(12) United States Patent
Shapiro et al.

(10) Patent No.: US 9,682,502 B2
(45) Date of Patent: *Jun. 20, 2017

(54) IN-MOLD LABEL FORMING SURFACES FOR MOLDED ARTICLES

(71) Applicant: MODERN PACKAGING LLC, Chicago, IL (US)

(72) Inventors: Benjamin Shapiro, Chicago, IL (US); Christopher Wlezien, Chicago, IL (US); J. Joseph Tokich, Chicago, IL (US)

(73) Assignee: Modern Packaging LLC, Chicago, IL (US)

( * ) Notice: Subject to any disclaimer, the term of this patent is extended or adjusted under 35 U.S.C. 154(b) by 166 days.

This patent is subject to a terminal disclaimer.

(21) Appl. No.: 14/588,324

(22) Filed: Dec. 31, 2014

(65) Prior Publication Data

US 2015/0111006 A1  Apr. 23, 2015

Related U.S. Application Data

(63) Continuation of application No. 14/052,527, filed on Oct. 11, 2013, now Pat. No. 8,968,618.

(Continued)

(51) Int. Cl.
*B29C 45/14* (2006.01)
*B29C 45/16* (2006.01)
(Continued)

(52) U.S. Cl.
CPC .. *B29C 45/14778* (2013.01); *B29C 45/14008* (2013.01); *B29C 45/1679* (2013.01);
(Continued)

(58) Field of Classification Search
None
See application file for complete search history.

(56) References Cited

U.S. PATENT DOCUMENTS

| 3,074,840 A | 1/1963 | Teplansky et al. |
| 3,580,473 A | 5/1971 | Gill |

(Continued)

FOREIGN PATENT DOCUMENTS

| GB | 779053 | 7/1957 |
| JP | 60-15795 | 1/1994 |

(Continued)

OTHER PUBLICATIONS

Conventional IMLs, Summer 2013, five (5) pages.

(Continued)

*Primary Examiner* — Edmund Lee
(74) *Attorney, Agent, or Firm* — Winston & Strawn LLP

(57) ABSTRACT

A method of making a molded article having a curved surface, such as plates or serving trays, and the resulting molded articles. The in-mold label (IML) is a laminated film that includes a backing layer, a printed surface incorporating one or more designs thereon, a protective film layer, and one or more notches each having adjacent edges separated by a gap of predetermined distance and configured to intersect to ensure conformance of the IML to the angled or curved peripheral portion of the article. The article has front and back sides and a central portion bounded by a peripheral portion having a perimeter that is raised on the front side of the article wherein the peripheral portion transitions from the perimeter to the central portion by an angled surface, a curved surface or combinations thereof, with the article including the IML at least peripheral portion of the molded article.

20 Claims, 9 Drawing Sheets

Related U.S. Application Data

(60) Provisional application No. 61/847,387, filed on Jul. 17, 2013.

(51) Int. Cl.
*B32B 3/08* (2006.01)
*B29K 23/00* (2006.01)
*B29L 31/00* (2006.01)

(52) U.S. Cl.
CPC ...... *B32B 3/08* (2013.01); *B29C 2045/14868* (2013.01); *B29C 2045/14926* (2013.01); *B29K 2023/12* (2013.01); *B29K 2623/12* (2013.01); *B29K 2995/001* (2013.01); *B29L 2031/7404* (2013.01); *B32B 2307/4023* (2013.01); *B32B 2451/00* (2013.01); *Y10T 428/1352* (2015.01); *Y10T 428/24628* (2015.01); *Y10T 428/24653* (2015.01)

(56) References Cited

U.S. PATENT DOCUMENTS

| | | | |
|---|---|---|---|
| 3,633,221 A | 1/1972 | Addison et al. | |
| 3,931,385 A | 1/1976 | Sutch | |
| 4,020,140 A | 4/1977 | Rumball | |
| 4,076,790 A * | 2/1978 | Lind | B29C 43/02 264/138 |
| 4,108,587 A | 8/1978 | Rumball | |
| 4,401,232 A | 8/1983 | Constable et al. | |
| 4,500,573 A | 2/1985 | Piaggi | |
| 4,898,706 A | 2/1990 | Yabe et al. | |
| 5,604,006 A | 2/1997 | Ponchaud et al. | |
| 6,516,548 B2 | 2/2003 | Lage et al. | |
| 6,652,983 B1 | 11/2003 | Mori | |
| 6,660,337 B2 | 12/2003 | Haruta et al. | |
| 6,790,400 B1 * | 9/2004 | Muller | B29C 45/14008 264/247 |
| 6,844,071 B1 | 1/2005 | Wang et al. | |
| 7,011,728 B2 | 3/2006 | Dewig et al. | |
| 7,140,857 B2 * | 11/2006 | Graham | B29C 45/14 249/96 |
| 7,507,363 B2 | 3/2009 | Meyer et al. | |
| 7,527,758 B2 | 5/2009 | Kiel | |
| 8,083,979 B2 | 12/2011 | Hayes et al. | |
| 8,372,913 B2 | 2/2013 | Claes | |
| 2001/0019761 A1 * | 9/2001 | Iriyama | B29C 45/14811 428/200 |
| 2002/0097280 A1 | 7/2002 | Loper et al. | |
| 2007/0165079 A1 | 7/2007 | Schulmeister | |
| 2009/0160087 A1 | 6/2009 | Yang | |
| 2010/0247859 A1 | 9/2010 | Park et al. | |
| 2012/0052226 A1 | 3/2012 | Gleixner | |
| 2012/0292330 A1 | 11/2012 | Artun | |

FOREIGN PATENT DOCUMENTS

| | | |
|---|---|---|
| JP | 2005-91650 | 4/2005 |
| JP | 2010-158339 | 7/2010 |
| WO | 01/96079 A2 | 12/2001 |
| WO | 2004/016438 A1 | 2/2004 |
| WO | 2005/021251 A1 | 3/2005 |

OTHER PUBLICATIONS

Berhalter AG, In-Mold Labels (IML), http://www.berhalter.ch/pages/InMouldLabels(IML).php?1=en, one (1) page, retrieved Oct. 7, 2013.
Talk Graphics, http://www.talkgraphics.com/showthread.php236444-Creating-labels-for-curved-surfaces, seven (7) pages, retrieved Oct. 8, 2013.
IMDA Award winners show creative design, engineering for in-mold labels, www.convertingquarterly.com, 2011 Quarter 4.
U.S. Appl. No. 14/052,527, Restriction Requirement, Feb. 5, 2014.
U.S. Appl. No. 14/052,527, Non-Final Office Action, Aug. 29, 2014.
U.S. Appl. No. 14/052,527, Final Office Action, Dec. 3, 2014.
U.S. Appl. No. 14/052,527, Notice of Allowance, Dec. 31, 2014.

* cited by examiner

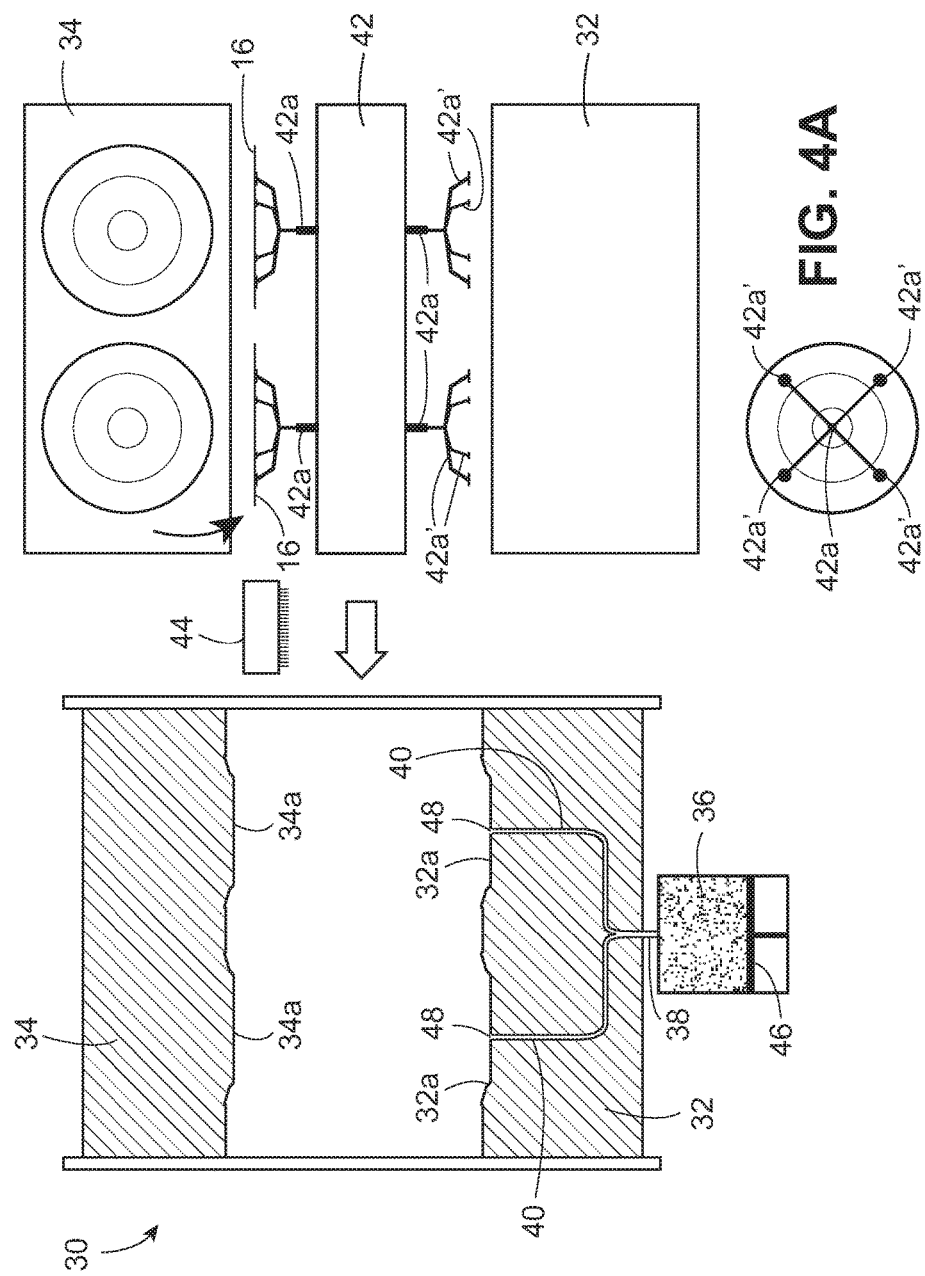

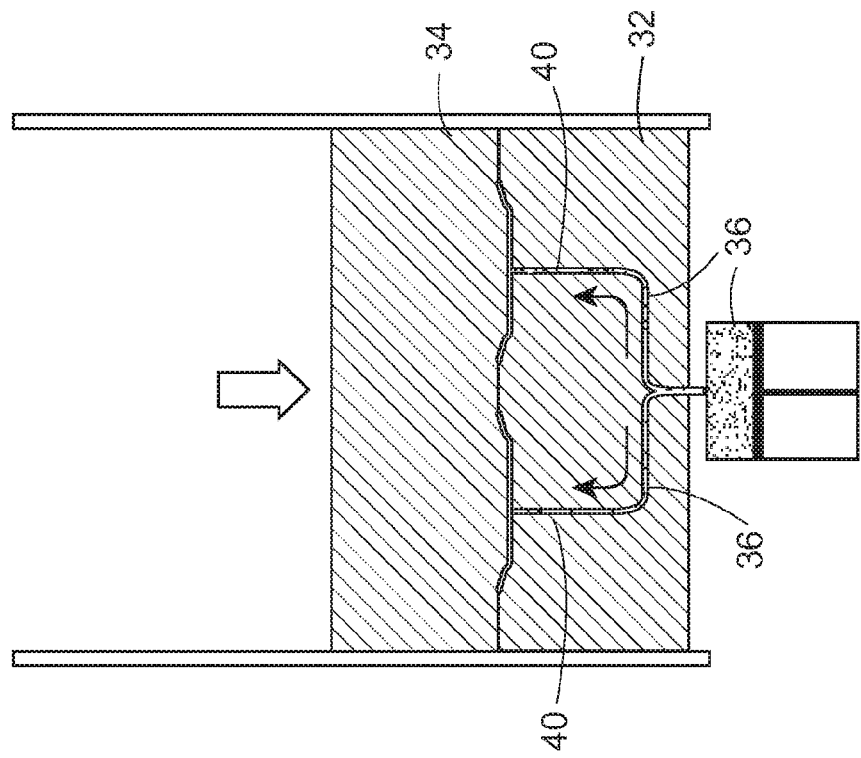
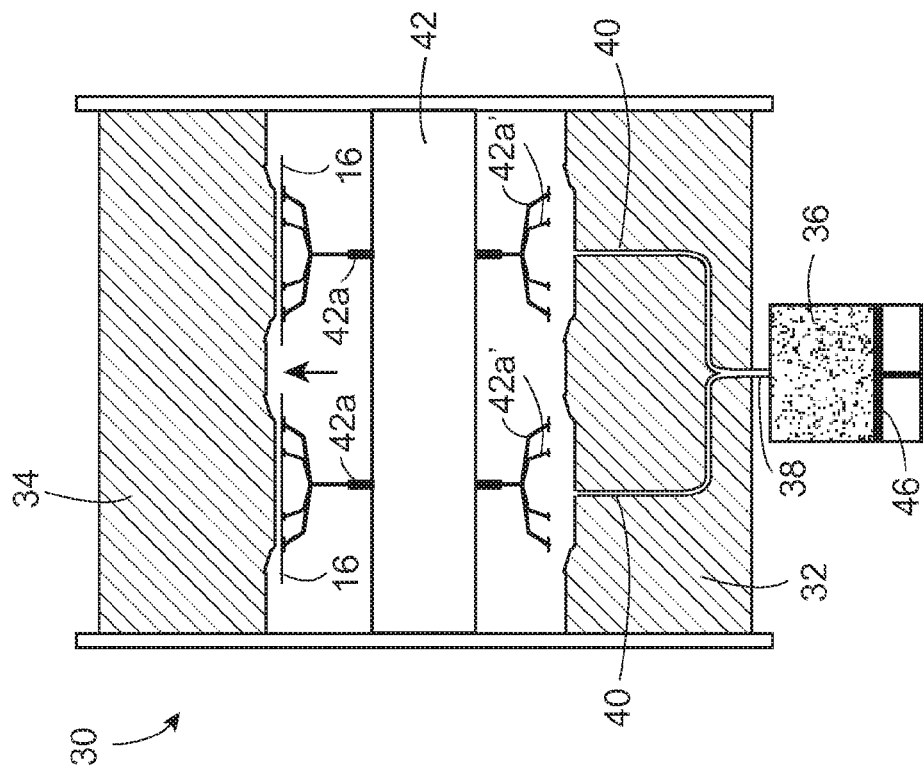

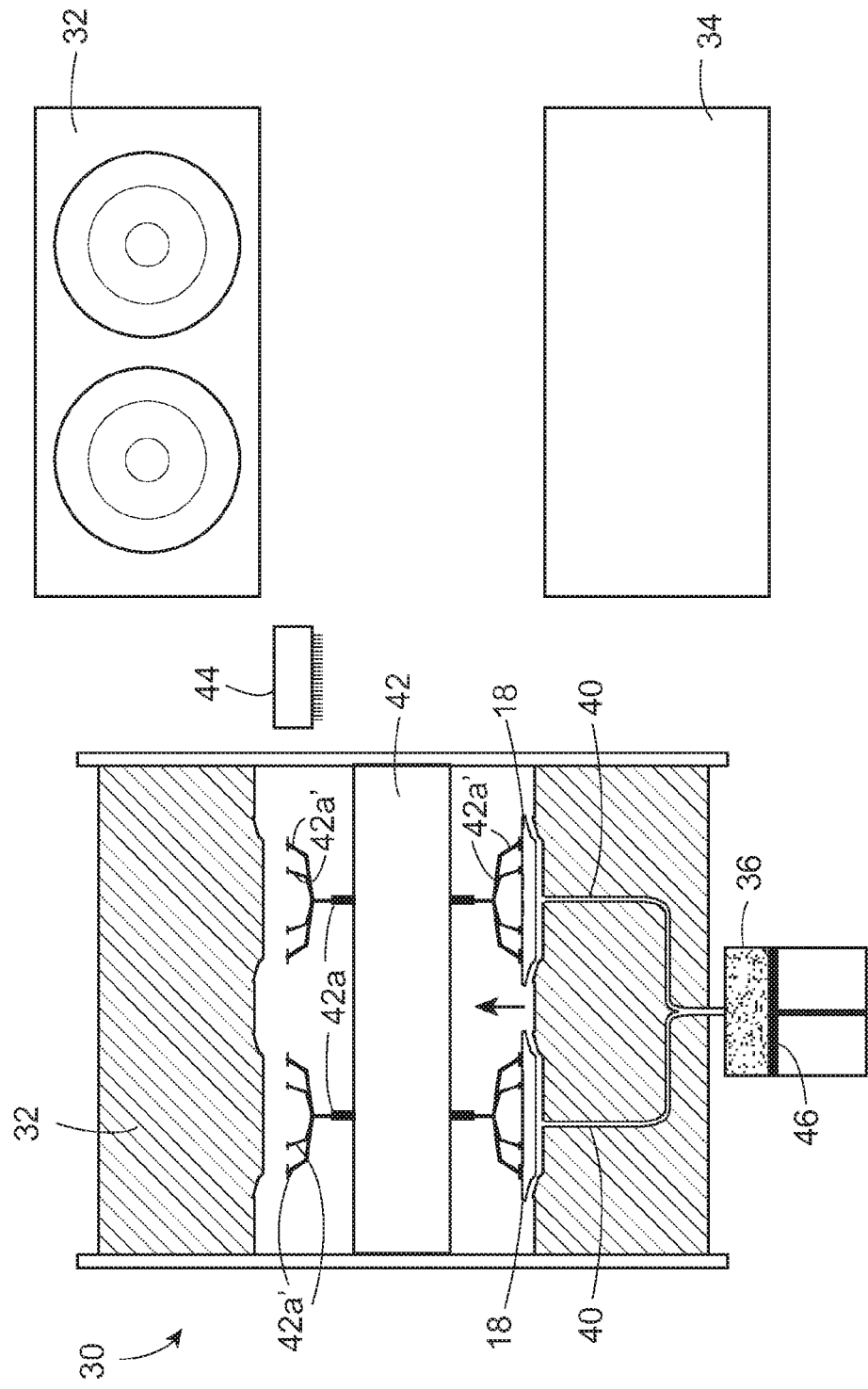

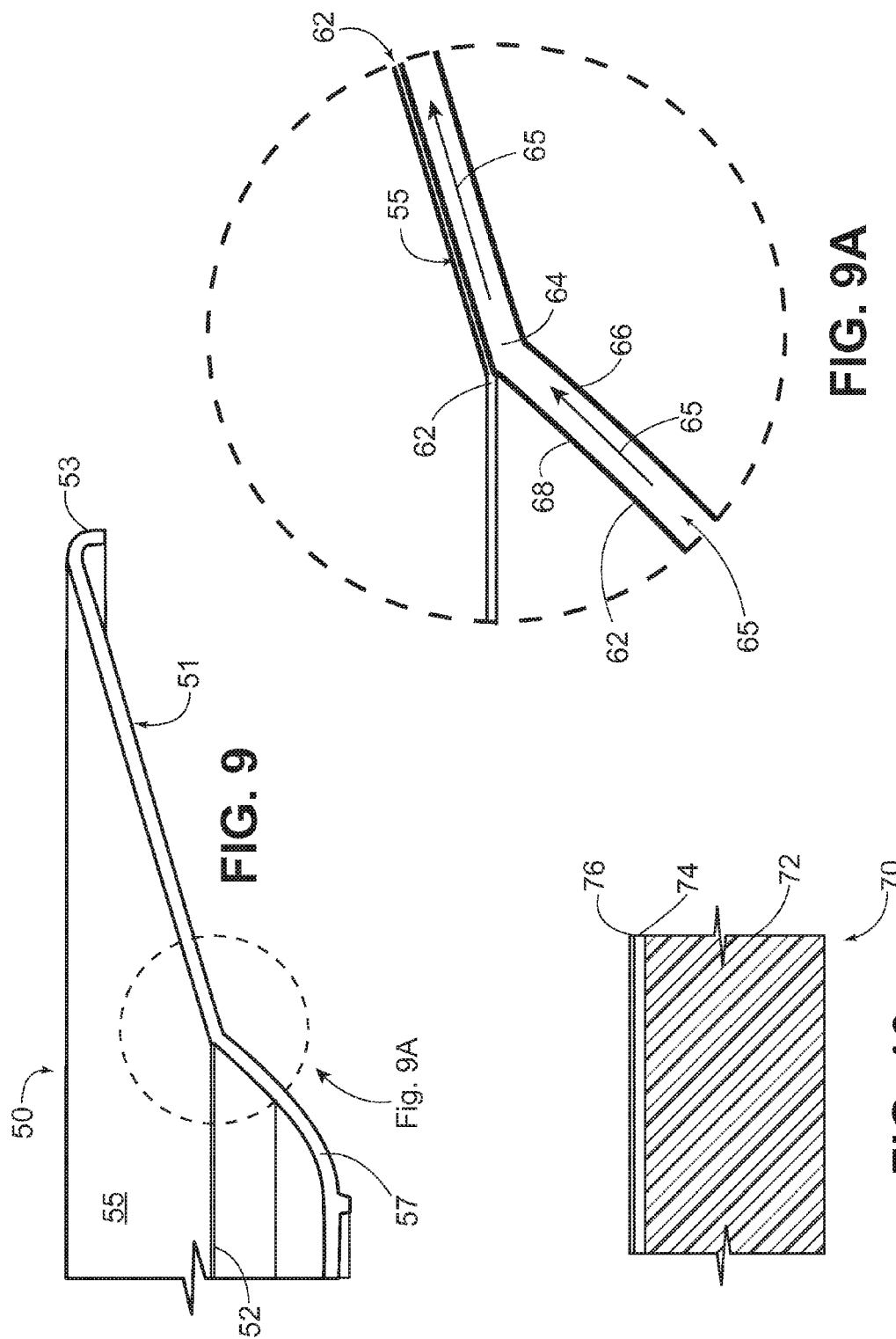

IN-MOLD LABEL FORMING SURFACES FOR MOLDED ARTICLES

CROSS-REFERENCE TO RELATED APPLICATIONS

This application is a continuation of application Ser. No. 14/052,527 filed Oct. 11, 2013, now U.S. Pat. No. 8,968,618, which claims the benefit of application No. 61/847,387 filed Jul. 17, 2013. The entire content of each prior application is expressly incorporated herein by reference thereto.

FIELD OF TECHNOLOGY

The present invention relates to systems and methods for integrating one or more graphic designs as a surface on a molded article. This is typically achieved by providing the designs on a label that is incorporated into the article during a molding process.

BACKGROUND

Labels that are integrated with a mold surface to achieve a desired aesthetic effect are commonly known as "in-mold labels" (IMLs). IMLs are frequently used in the fabrication of molded articles for aesthetic enhancement thereof. Such molded articles are typically consumer products such as cups, containers and complementary items that can be mixed and matched to attain a plurality of aesthetic effects while retaining the functional attributes of the molded articles.

Attempts have been made for optimal positioning of IMLs as surfaces of molded resins that are not readily receptive to other types of decorative application (e.g., paints, inks, decals and the like). For example, U.S. Pat. No. 5,498,307 to Stevenson is directed to a method of in-mold labeling using an adhesive. The method includes forming a pattern structure by applying indicia to a first layer made from a specific plastic material. A clear second layer made from the specific plastic material is applied over the first layer, the first and second layers are bonded. The pattern structure is applied to an interior surface of a mold cavity, and the mold cavity is charged with the specific plastic material. An adhesive retains the pattern structure in the mold cavity. The pattern structure and plastic material are heated, thereby disbursing the plastic material to form a shape of a plastic part. After the plastic part is cooled, the part is removed from the mold cavity with the pattern structure as an integral part of the plastic part.

This method, along with other known methods and devices, anticipates known deficiencies in adhesive systems. It is understood that the placement of a graphic in an inner mold cavity should be consistent to ensure accurate application of the graphic on each molded article. The graphic should not come loose from the mold during the molding process, either as a result of the heating and cooling cycle or as a result of resin abrasion during the molding process. If the graphic wrinkles or curls during the molding process, the molded part will be aesthetically ruined and therefore unfit for commercial sale.

Despite these known methods and devices, adhesive retention of a pattern structure is still required, thereby introducing material and temporal costs into the molding process. Even with adhesive retention, prior approaches dismiss the importance of complete or contoured graphic coverage on a molded article surface and integration of designs for use of the molded article by consumers and potential consumers.

In addition, prior approaches have avoided the application of IMLs to plastic plates, serving dishes, utensils and other complex curved surfaces intended for serving and/or handling food. Typical applications of the IML are made on an essentially flat surface that is eventually sold as a food container (e.g., a yogurt container), or on outer portions of cylindrical containers that have a uniform curvature allowing for the smooth placement of a flat label that may or may not have cut out portions. For products contemplated for food service, however, previous label concepts required pre-folded labels having expensive laminate configurations that are not food-grade quality or are not intended to come into contact with food but instead are applied to the outside of a food container, such as a yogurt cup (see, e.g., the disclosure and discussion at http://www.talkgraphics.com/showthread.php?36444-Creating-labels-for-curved-surfaces). Scored labels also exist, but these are also generally used for applying a label to the outer surface or a cup, cylindrical or polygonal container.

A need therefore persists for improved approaches to graphic labels and their employment in the integration of graphics with molded articles, and particularly molded articles intended for use with food.

SUMMARY OF THE INVENTION

The present invention is directed to a method of making a molded article having front and back sides and a central portion bounded by a peripheral portion having a perimeter that is raised on the front side of the article wherein the peripheral portion transitions from the perimeter to the central portion by an angled surface, a curved surface or combinations thereof, with the article including an in mold label (IML) at least on the angled or curved peripheral portion of the article. The method comprises:

providing an in-mold label;

providing a mold used in a molding process during which the molded article is fabricated, with the mold having a mold cavity formed by first and second molding surfaces with the first surface corresponding to the front side of the article and the second surface corresponding to the back side of the article, into which cavity resin is deposited to form the article and from which the molded article is extracted;

transferring the IML to the mold so that the printed surface of the IML is placed adjacent one of the molding surfaces of the mold cavity;

closing the mold by bringing the other of the molding surfaces into position to form the mold cavity;

delivering the resin to the mold cavity having the IML therein; and recovering the molded article from the mold with the IML present at least on the peripheral portion of the molded article.

Suitable IMLs are those that comprise:

a laminated film, comprising a backing layer, a printed surface supported by the backing layer, with the printed surface incorporating one or more designs thereon, and a protective film layer upon the printed surface; and one or more notches spaced along the perimeter of the IML with each notch having adjacent edges separated by a gap of predetermined distance and configured to intersect to ensure conformance of the IML to the angled or curved peripheral portion of the article.

Advantageously, the IML is electrostatically charged prior to disposition in the mold and the printed surface of the IML includes one or more aesthetic designs. The IML may be placed on the mold surface that forms the front side of the molded article, with the backing layer of the IML contacting the peripheral portion of the front side of the molded article and the protective layer forming part of a front surface of the molded article, with the protective film layer being sufficiently transparent so that the aesthetic design is visible therethrough. Alternatively, the IML may be placed on the mold surface that forms the back side of the molded article, with the backing layer of the IML contacting the peripheral portion of the back side of the molded article and the protective film layer forming part of a back surface of the back side of the molded article, with the molded article and backing layer being sufficiently transparent so that the aesthetic design is visible therethrough. The backing layer preferably comprises a clear layer of polypropylene or polystyrene, and the protective film layer comprises polypropylene or polyester. In accordance with good molding practices, the method includes subjecting the resin to a heating and cooling cycle for controlling resin flow and retaining the molded article shape.

The method may also include custom fitting the IML label to conform to the molded article before transferring the IML to the mold surface by configuring the one or more notches of the IML to have adjacent edges separated by a predetermined distance and configured to intersect to ensure conformance of the IML to angled curved mold surfaces during the molding process without perceptible wrinkling, wherein optionally a minimum intersection of 0.5 mm is provided. The custom fitting can include providing the IML and molded article with a generally polygonal geometry with each one notch provided at each corner of the IML and each gap configured to intersect along sharp corners wherein walls of the peripheral portion of the molded article come together. For this embodiment, the IML and molded article each have a generally polygonal shape having 3 to 8 sides.

The molded article and IML may instead have are a round or oval perimeter and the custom fitting further comprises providing the IML in two or more arc segments for application to the peripheral portion of the molded article with each arc segment configured and dimensioned to intersect with an adjacent arc section to form a continuous surface on the peripheral portion of the article. For this embodiment, the IML may include a central segment for application to the central portion of the molded article and when so provided each arc segment of the IML includes a connection neck to the central segment to facilitate placement of the IML on the mold surface.

To facilitate injection of the resin into the mold without disturbing the placement of the IML, the method includes providing the mold with an integral shelf configured to retain the IML on the mold surface during the molding process and further configured to direct resin flow beyond an IML edge while avoiding entry of resin between the label and the mold surface, wherein the shelf has a height about three times a thickness of the IML.

To facilitate manufacture of the molded articles, the method further comprises providing a magazine to hold multiple IMLs in place for transfer to the mold surface. The most preferred molded articles are those comprising a plastic plate or serving tray having a profile selected from a plurality of round, oval or polygonal profiles or combinations thereof. When the IML includes printing on both sides of the backing layer, the molded article is made of clear resin so that the printing is visible from both the front and back sides of the molded article.

Another embodiment of the invention is a molded article having front and back sides and a central portion bounded by a peripheral portion having a perimeter that is raised on the front side of the article wherein the peripheral portion transitions from the perimeter to the central portion by an angled surface, a curved surface or combinations thereof, with the article including an in mold label at least on the angled or curved peripheral portion of the article. The IML comprises a laminated film, comprising a backing layer, a printed surface supported by the backing layer, with the printed surface incorporating one or more designs thereon, and a protective film layer upon the printed surface; and one or more notches spaced along the perimeter of the IML with each notch having edges that intersect to ensure conformance of the IML to the angled or curved peripheral portion of the article.

The printed surface of the IML includes one or more aesthetic designs and the backing layer of the IML contacts the peripheral portion of the front side of the molded article with the protective layer forming part of a front surface of the molded article and with the protective film layer being sufficiently transparent so that the aesthetic design is visible therethrough. As above, an alternative is that the backing layer of the IML contacts the peripheral portion of the back side of the molded article with the protective film layer forming part of a back surface of the molded article, with the molded article and backing layer being sufficiently transparent so that the aesthetic design is visible therethrough.

For optimum results, the notch edges of the IML have a minimum intersection of 0.5 mm, the molded article either has a generally polygonal shape having 3 to 8 sides, a round or oval perimeter, or a combination thereof. The backing layer generally comprises a clear layer of polypropylene or polystyrene, the protective film layer comprises polypropylene or polyester and the molded article is in the form of a plate or serving tray having a round, oval or polygonal plate profile or a combination thereof. The molded article and IML can have a round or oval perimeter with the IML having two or more arc segments with each arc segment intersecting with an adjacent arc section to form a continuous surface on the peripheral portion of the plate or serving tray and, if desired, the IML can include a central segment applied to the central portion of the plate or serving tray and each arc segment of the IML includes a connection neck to the central segment, wherein each connection neck is clear or has a color that matches that of the plate or serving tray. As noted herein, when the IML includes printing on both sides of the backing layer and the molded article is made of clear resin so that the printing is visible from both the front and back sides of the molded article.

Additional aspects of the presently disclosed invention will be made apparent from the appended drawings and the following detailed description.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which:

FIGS. 4, 4A, 5, 6, 7 and 8 show steps of an exemplary molding process for fabricating molded articles having an IML forming at least one surface thereof.

FIG. 9 is a partial cross-sectional view of a plastic plate fabricated according to the process of FIGS. 4 to 8.

FIG. 9A is an illustration of part of the mold to show how the label is retained therein without movement when encountering resin flow.

FIG. 10 shows a sectional view of the IML showing its layers.

DETAILED DESCRIPTION OF THE INVENTION

Figure 1:
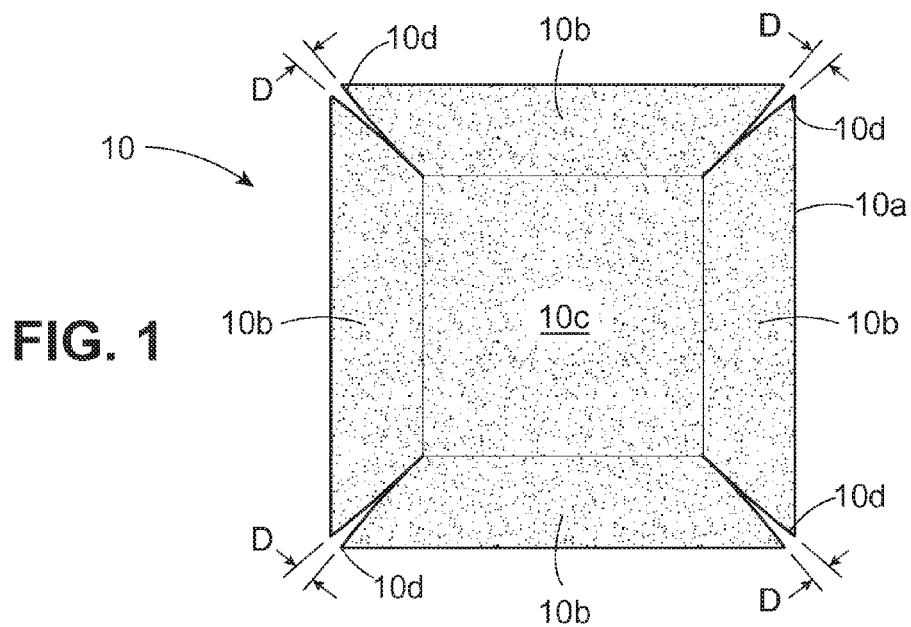
FIG. 1 shows a top view of an exemplary in-mold label (IML) having a generally rectangular geometry.

The invention utilizes an in-mold label (IML) for forming a surface of a molded article. The label includes a laminated film having a backing layer and a printed surface supported thereby. The printed surface incorporates one or more designs thereon. One or more notches may be provided along the perimeter of the IML in spaced relation, with each notch having adjacent edges separated by a gap of predetermined distance. The adjacent edges are configured to intersect to ensure conformance of the IML to curved mold surfaces during the molding process. The IML is configured to avoid wrinkling upon injection of a resin in the mold cavity disposed during a molding process from which the molded article is fabricated.

In some embodiments, the IML may also include a protective film layer upon the printed surface. The notch edges may be configured to exhibit a minimal intersection of 0.5 mm when applied to a curved mold surface. In embodiments where the IML has a generally rectangular geometry commensurate with a geometry of the molded article to which the IML is applied, the notches include a notch provided at each corresponding corner of the IML. In such embodiments, each gap is configured to intersect along sharp corners where walls of the molded article come together. In other embodiments, the entire edges of the notches overlap or underlap to form what is perceived to be a seamless design.

The IML may be provided as a single member or it may be provided in two or more sections to form one or more surfaces of a molded article. The sections may include one of (a) at least two arc segments of a circle which are applied to the peripheral portion of a round molded article, or (b) a circular section applied to the center of a round molded article and a further section applied to a different area of the molded article. The IML preferably includes an outer periphery configured to sit just inside a perimeter of the molded article surface.

The IML can include printing on both sides if desired. Alternatively, the IML may include on the printed surface a functional ink that provides an indicator of temperature.

Also provided is an exemplary method of making a molded article that includes providing an IML as described herein. A mold is provided that is used in a molding process during which the molded article is fabricated. The mold has a mold cavity into which resin is deposited and from which the molded article is extracted. The IML is transferred to the mold so that the printed surface of the IML is placed adjacent a wall of the mold cavity. Resin is delivered to the mold cavity having the IML therein, and the molded article is recovered therefrom.

In some embodiments, the IML is electrostatically charged prior to disposition in the mold. Alternatively, the mold is designed to provide vacuum retention of the IML in the desired position in the mold. Optionally, the resin may be subjected to a heating and cooling cycle for controlling resin flow and retaining the molded article shape with the IML forming a surface of the molded article. The printed surface of the IML may be printed upon prior to placement of a layer of protective film thereon. During the printing, one or more aesthetic designs selected from a plurality of aesthetic designs are incorporated on the printed surface. In some embodiments, the printed surface forms a top surface of the molded article. In some embodiments, the resin contacts the printed surface such that the printed surface is visible through the resin upon curing thereof. In other embodiments, the IML may have one design on one side and a different design on the opposite side. Then clear resin is molded around the label to form the article, the article can have one appearance on the front and a different appearance on the back.

The resin may be a thermoplastic resin and is generally introduced into the mold at a point corresponding to a central area of the article. A magazine may be provided during the molding process for holding multiple IMLs in place for transfer to the mold cavity.

The IML label may be custom fitted before transferring the IML to the mold by providing one or more notches spaced along the perimeter of the IML. Each notch has adjacent edges separated by a predetermined distance and configured to intersect to ensure conformance of the IML to curved mold surfaces during the molding process. Optionally a minimum intersection of 0.5 mm is provided. The custom fitting may include providing the IML with a generally rectangular geometry commensurate with a geometry of the molded article to which the IML is applied with each notch provided at a corresponding corner of the IML and each gap configured to intersect along sharp corners where walls of the molded article come together. Alternatively, the custom fitting may include providing the IML in two or more sections for application to the molded article surface. With an appropriate overlapping or underlapping of the IML sections, a seamless appearance of the design can be achieved.

The mold may be provided with an integral shelf configured to retain the IML on the molded article surface during the molding process. The integral shelf may be further configured to direct resin flow beyond an IML edge while avoiding entry of resin between the label and the mold. The shelf may have a height about three times a thickness of the IML. Also, the IML may be electrostatically charged or held in place by vacuum to assist in providing the IML at the proper position for molding into the article.

During a molding process, the IML may be transferred to the mold so that the printed surface and protective layer face are placed adjacent a wall of the mold cavity to form a top surface of the molded article. In some molding processes, the IML is transferred to the mold so that the printed surface faces away from a wall of the mold cavity to form a surface of a back side of the molded article. The molded article may be a plastic plate having a plate profile selected form a plurality of plate profiles.

Also provided is a mold having a mold cavity for the fabrication of molded articles thereby. The mold includes an integral shelf provided in the mold cavity and configured to retain an IML in place relative to an article being molded. The mold cavity provides each molded article with a curvature to which the IML conforms. Resin is deposited into the mold cavity during a molding process with the IML conforming to the curvature without wrinkling during the molding process.

A plurality of molded articles is also provided that are fabricated by a mold as described herein, with each molded article having one or more decorative patterns from one or more IMLs.

A molded article is additionally provided having one or more IMLs or IML sections as described herein. The IML is provided as a surface with intersecting notches to form a continuous pattern supported by the plastic substrate. The molded article may be a plastic plate having a plate profile selected from a plurality of plate profiles including round, polygonal or combinations thereof. The IML is may be provided as a top surface with an exterior protective film layer disposed thereon, with the protective film layer, which is preferably and conveniently selected from polypropylene and polyester but which may be other materials. Alternatively, the plate may be fabricated from a thermoplastic resin that is transparent upon cure and the IML is provided as a surface of a back side of the plate such that the continuous pattern is provided on the surface of the IML that contacts the plate and that is visible through the plate. In a preferred arrangement, both the label and article are made of the same material, e.g., polypropylene, to facilitate recycling.

Another embodiment of the invention relates to a method of providing a molded article with an in mold label (IML) that conforms to one or more locations on the surface of the article without surrounding the article. This method comprises configuring a molded article to have top or bottom surfaces with a certain curvature or shape; and designing the IML with one or more special features. These features comprise one or more of:

(a) one or a plurality of symmetrical notches that allow the IML to conform to a curved surface with edges of the notches intersecting;

(b) one of more sections having edges that intersect to conform to a curved surface;

(c) a predetermined arrangement to conform to a location on the article such that, when placed in a mold cavity, injected resin contacts a back side of the IML to force it against the mold cavity and retain its position thereon during molding of the article; or (d) an edge or edges that conform to an integral shelf provided in a mold cavity so that injected resin does not flow between the IML and the mold cavity or cause movement to the IML from a desired position in the mold.

The IML is typically applied to the surface location(s) without crinkling or buckling when the article is molded with the IML. Further features of the method include providing a mold having a mold cavity that receives the IML therein and injecting resin into the mold to form the article.

Now referring to the figures, wherein like numbers represent like elements, FIG. 1 shows an exemplary in-mold label (IML) 10 for forming a surface of a molded article. As used herein, "IML" and "label" may be used interchangeably to refer to any layer or film having a graphic integral therewith or included thereon and which is incorporated as a surface on a molded article to achieve a variety of aesthetic choices therefor.

The molded article may preferably be a consumer product such as a plastic plate 12 (shown and described further herein with respect to FIGS. 2A and 2B), although such molded article may be any product amenable to incorporation of one or more IMLs thereon. Plate 12 (or any other molded article) may be fabricated from a range of suitable materials, including but not limited to polystyrene (PS and including HIPS), polypropylene (PP), styrene acrylonitrile (SAN), and commensurate materials. The selected materials may be disposable, reusable and/or recyclable. Other articles such as serving trays or bowl of other shallow containers can be provided with IMLs in accordance with the invention.

Although IML 10 is shown as a rectangular member, it is understood that IML may assume any geometry amenable with the practice of the presently disclosed invention. For example, an alternative circular IML 16 is shown and described with respect to FIGS. 4A and 5 as another exemplary label geometry for placement with respect to a round plate 18 (shown in FIG. 3). The geometry of the IML is not limited to these two geometries and may be customized to form a surface commensurate with a geometry of the molded article to which the label is applied. For example, the plate may have a polygonal shape with rounded corners.

Figure 2A:
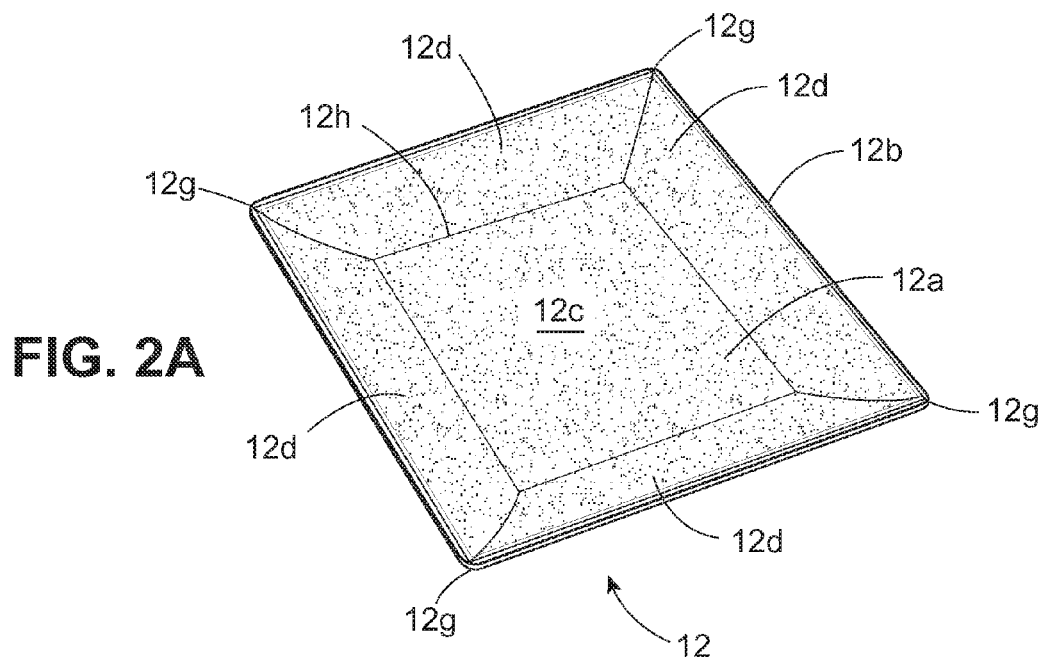
FIG. 2A shows a top perspective view of an exemplary molded article having a surface formed by the IML of FIG. 1.

Referring further to FIGS. 1 and 2A, IML 10 is depicted as a generally rectangular label having an outer periphery 10a defined by adjacent sides 10b. IML 10 may be a laminated film having a backing layer (not shown) for contact with a top surface 12a of plate 12. A printed surface 10c supported by the backing layer incorporates one or more designs such as the graphic shown in FIGS. 1 and 2a. The graphic may be selected from a plurality of aesthetic varieties and is not limited to the graphic design shown herein.

Top surface 12a of plate 12 is delineated by a generally rectangular perimeter 12b. A service area 12c is provided on top surface 12a (e.g., to place food or other items thereon) and bounded by consecutive walls 12d such that a curved mold surface 12h serves as an interface between the service area and perimeter 12b. When IML 10 forms a portion of top surface 12a during a molding process, the graphic covers substantially all of service area 12c and walls 12d. Outer periphery 10a of IML 10 is configured to sit just inside perimeter 12b as shown in FIG. 2A. Regardless of the geometry of the IML, the IML is provided with an outer periphery that is configured to sit just inside the perimeter of the molded article surface and is sufficiently sized to fit the angled or curved peripheral portions of the article.

Figure 2B:
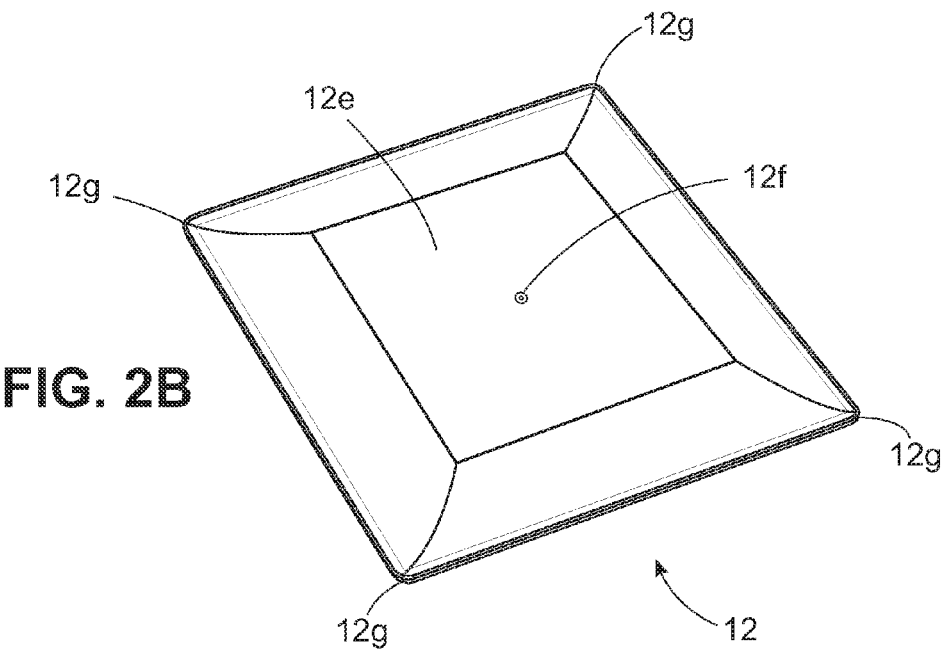
FIG. 2B shows a bottom perspective view of the exemplary molded article of FIG. 2A.

As further shown in FIG. 2B, a bottom surface 12e of plate 12 is fabricated from a thermoplastic resin. In the final molded article, a gate mark or ejector pin mark 12f may be visible that account for dimensional differences of the mating mold surfaces contacting the injected polymer. Dimensional differences may be attributed to non-uniform, pressure-induced deformation during injection, machine tolerances and non-uniform thermal expansion and contraction of mold components that experience rapid cycling during the injection, packing, cooling, and ejection phases of an injection molding process.

One or more notches 10d are provided spaced along the perimeter of the IML with each notch having adjacent edges that are separated by a gap of predetermined distance D and configured to intersect one another when IML 10 forms a surface of plate 12 during a molding process (as further described hereinbelow). As used herein, "notches" refer to incisions, slits, cuts and scores that are intentionally created and positioned in an IML to ensure predictable and repeatable integration of a decorative surface upon a molded surface of complex curvature. Generally these notches have a V shape with the angle of the V being a small acute angle which is calculated so that the IML conforms to the angled or curved surfaces of the molded article. As used herein, the term "intersect" means that the label edges are in adjacent relation such that there is a visually perceived continuity of the design or information on the article. Preferably, the visually perceived continuity of the design or information appears to be seamless. Thus, "intersect" includes arrangements that include overlap or underlap of the edges of the label portions as well as contact along or meeting of the edges. In some embodiments, the edges of the notches can simply be placed sufficiently close and adjacent each other without contact but without distorting the visible pattern of the design. Preferred adjacent distances of 0.005 to 0.05 mm are useful depending upon the specific design while overlap provides optimum results for others. When seamless complex designs are desired, the IMLs or IML sections will typically overlap or underlap by at most a few millimeters in order to assure that the pattern or the design will repeat in a continuous or seamless fashion. The overlap or underlap will typically be in the range of 0.5 to 1 mm.

The use of a slight overlap in the present invention is a significant departure from prior IMLs as it was understood by skilled artisans that unintentional or even intentional overlapping of label edges would lead to buckling, wrinkling or crinkling of the IML in the final article. The present invention achieves substantial improvements in continuity of the design or pattern by utilizing this heretofore undesired feature of overlapping or underlapping, at least in part because of the precise engineering positioning of the IML segments and the controlled geometry of the cut out notches or portions as described herein.

In embodiments where IML 10 exhibits a rectangular geometry, each notch 10d is provided at a corresponding corner of the IML and each gap is configured to intersect along sharp corners 12g where walls 12d of the plate come together. In some embodiments, the notch edges are configured to exhibit a minimal intersection of 0.5 mm when applied to a curved mold surface. In this manner, IML 10 is configured to avoid wrinkling upon injection of a resin in a mold cavity disposed during a molding process from which plate 12 is fabricated, while the intersection of the edges provides a continuous pattern with a minimum of space between them, with no space at all being visible especially when an overlap or underlap is included. An intersection of more than a few millimeters is generally not necessary.

In most embodiments, IML 10 may further include a protective film layer (see FIG. 10) upon printed surface 10c. In such embodiments, the laminated film comprises polystyrene polypropylene, or other such material compatible with the base layer of the label and/or substrate layer and the protective film layer is selected from polypropylene and polyester. Other materials can be used if desired but polypropylene is preferred due to its ready availability, compatibility with polypropylene molding resin and ease of recycling. The laminated film is typically clear or transparent although it may be provided with a color that does not mask or that complements the design or other printed indicia of the IML.

Although IML 10 may be provided as a single integral label as shown in FIGS. 1 and 2A, the IML may be provided in two or more sections or segments for application to form one or more surfaces of a molded article. For example, IML 10 may include at least two sections to achieve a variety of aesthetic features (e.g., a selected design provided along one wall 12d of plate 12 and a second selected design provided along an opposite wall 12d of the plate). Preferably, the design is continuous around the periphery of the plate.

Figure 3:
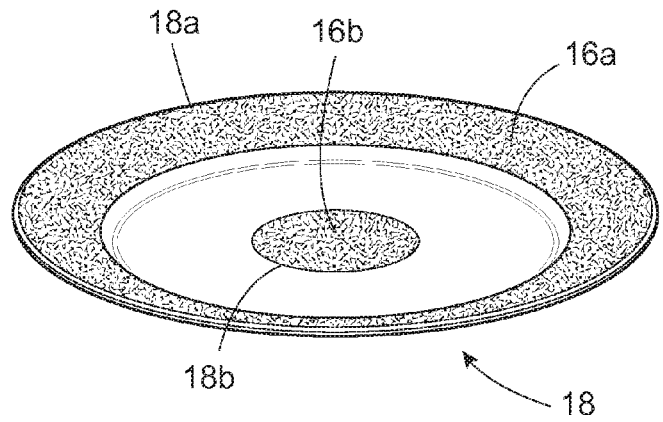
FIG. 3 shows another exemplary molded article having a surface formed by another exemplary IML.

As shown in FIG. 3, a plate 18 is generally circular and has an IML 16 forming a surface 16a along a plate wall 18a and another surface 16b along plate service area 18b. IML 16 provided along surface 16a may be provided in two or more sections with if necessary notches provided between adjacent sections such that adjacent edges of the notches intersect during a molding process. In such embodiments, IML 16 has at least a third portion that forms surfaces 16b. Surfaces 16a and 16b may have matching graphics or may include different graphics to achieve a desired aesthetic effect.

In conforming a particular IML to a curved surface of the article, mathematical modeling may be developed for the relationships between slope, radius of curvature, and the placement of slits or more complex openings to prevent wrinkling of the IML during placement and molding. These may be complex but can be computer assisted to reduce the trial and error time for conformance of the IML to the particular curved surface.

Now referring to FIGS. 4-8, an exemplary method of making and configuring a molded article is illustrated. As used herein, a "plastic part" or "shaped part" refers an article fabricated according to a molding process as described herein prior to removal of the article from a mold cavity. As used herein, a "molded article" refers to an article fabricated according to a molding process as described herein after removal of the article from the mold cavity.

Figure 8:
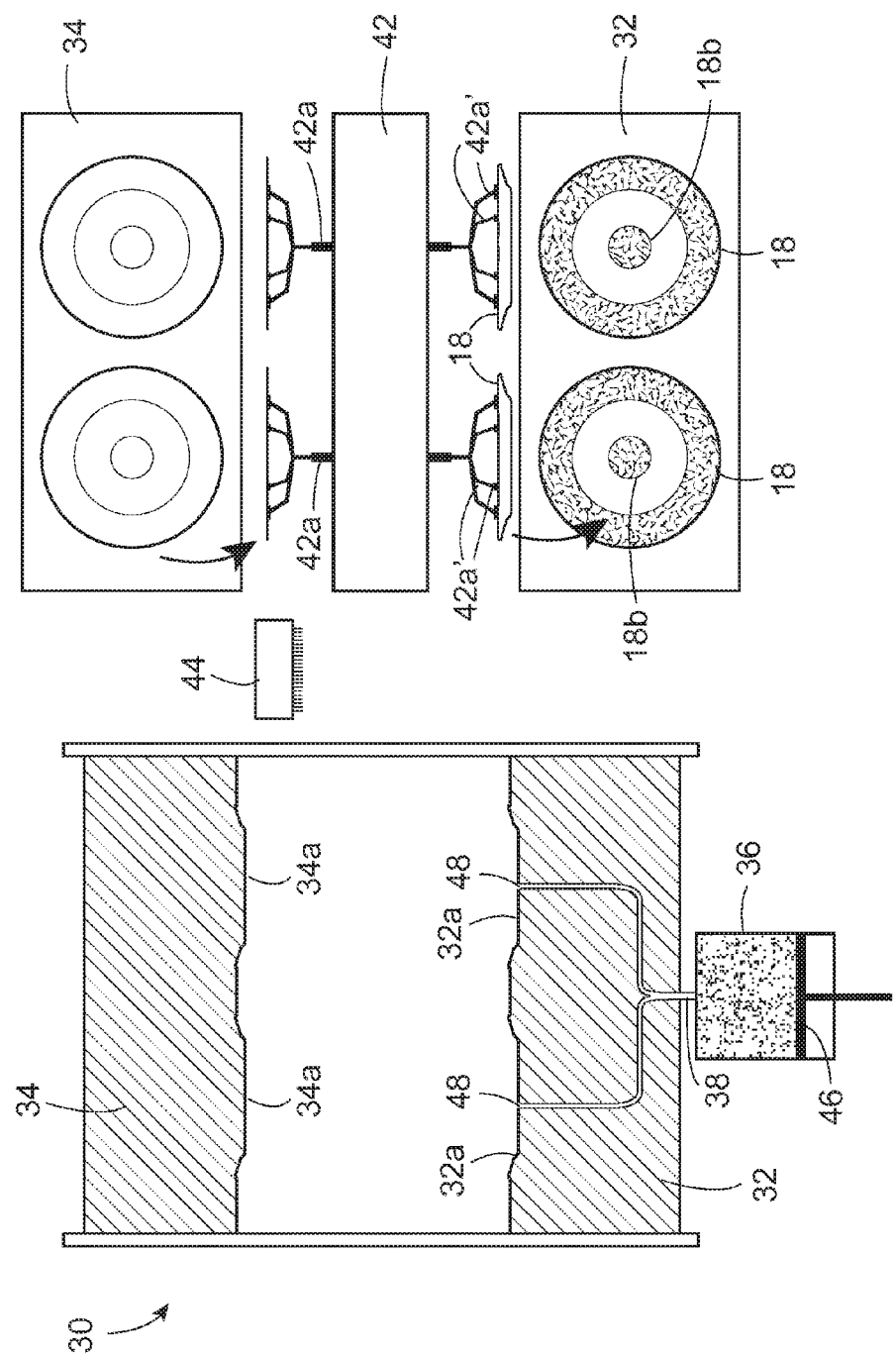

Referring to FIGS. 4 and 4A, a mold 30 is provided for producing one or more molded articles such as one or more plastic plates 18 (as shown in FIGS. 3, 7 and 8). Mold 30 includes a mold base 32 having one or more cavities 32a for shaping a plastic part during a molding process. Mold base 32 cooperates with a mold core 34 having one or more profiles 34a that cooperate with corresponding cavities 32a in mold base 32 during a molding process. A thermoplastic material 36 is fed through mold base 32 (e.g., via a sprue or nozzle 38) through channels 40 that deliver molten material or resin to each cavity 32a. Mold base 32 may include an ejection system (not shown) as known in the art to eject a plastic part from open mold cavities 32a when a clamping unit separates the mold halves.

One or more robotic assemblies may be employed for the transport of IMLs and molded articles. An exemplary robotic assembly 42 is shown in FIGS. 4A, 5, 7 and 8 that includes multiple grippers 42a for handling IMLs and plastic parts. Each gripper 42a may include a plurality of fingers 42a' that transport IMLs into mold 30 and finished molded articles out of mold 30. One or more of fingers 42a' may include an attachment means, such as a suction assembly (not shown), at a gripping extent thereof.

The IMLs can be provided in a magazine for collection by the robotic assembly for delivery into the mold. The IMLs can be pre-cut and stacked in the magazine to facilitate pickup by the gripper. Alternatively, the labels can be provided in an un-slit configuration, and a slitting device can provide the notches in the label either when the otherwise unslit IMLs are being placed into the magazine, or even after the IMLs have been loaded into the magazine. Alternatively, the un-slit IMLs can be slit after removal from a first magazine and then the slit or notched IMLs can be retained in a second magazine that cooperates with the grippers for introducing the IMLs into the mold. A skilled artisan can devise many different systems for slitting or notching the IMLs consistent with the disclosure herein. For example, die cutting is a simple and straightforward way of providing the notches in the IMLs prior to their introduction into the mold. If desired, the IMLs can be die cut just prior to their introduction in the mold.

Robotic assembly 42 is entrusted with several tasks, including but not limited to (a) retrieving one or more IMLs 16 (e.g., from a magazine that holds multiple IMLs in place for transfer to mold 30); (b) passing each IML within proximity of an electrostatic charger 44 (see FIGS. 4, 7 and 8) in those embodiments where the IMLs are electrostatically charged prior to entry in mold 30; (c) accurately positioning each IML relative to a corresponding profile 34a and cavity 32a prior to a molding process; (d) retrieving a plastic part from each mold cavity 32a upon completion of a molding process; and (e) placing the final molded articles (e.g., in an article transfer station) for further processing. Robotic assembly 42 may be selected from one or more commercially available robot picker configurations, including but not limited to independently actuatable automatic arms. A programmable controller may be programmed to move robotic assembly 42 relative to mold 30 and to pick up and release IMLs 16 and plastic plates 18 by controlling grippers 42a.

Although electrostatic charging of the IML is preferred, it is also possible to design the mold with appropriate ports to apply a vacuum to hold the label in place. In this alternative embodiment, the mold would be made using aluminum or ceramic tooling which is much more amenable to vacuum retention. In some situations, depending upon IML and article shape, vacuum retention can be used in steel molds as well.

The IMLs can be a flat label that is customized with one or more notches or slits in consideration of the molded article geometry. The flat labels with the notches can be placed into the magazine for gripping by the robot for placement into the mold. Such custom-fit labels can be designed to conform to almost any geometry although the deeper curvatures require more engineering and are not always necessary to achieve satisfactory results.

In other embodiments, the IML may have one design on one side and a different design on the opposite side. After clear resin is molded around the label to form the article, the article can have one appearance on the front and a different appearance on the back. Such two-sided or double-sided printing can also be used to provide a "decorated" side to the IML and an "informational or instructional" side to the IML. The informational or instructional side may include use instructions, recipes, details for cleaning or reusing the article, or how to recycle or dispose of the article. It also can include origin of manufacture, type of material, design pattern name or other identifying indicia. Again, after clear or transparent colored resin is molded around the IML to form the article, the article can have a design appearance on the front and instructional information for the appearance of the back.

The IML may also be specially designed for a particular purpose. IMLs that incorporate thermo-chromatic inks, 3-D effects, and the like can be used for special effects or measurements. For example, an IML that includes thermo-chromatic inks allow the article to be used as a thermometer or other heat indicator. As the article is disposable, this could be discarded after use rather than a conventional thermometer which would have to be cleaned or sterilized before reuse.

The following is an example of how to design a particular IML for a conventional round dinner plate having an angled peripheral portion, It has been found that optimum results are obtained when two peripheral portion arc segments are used, each covering about half of the peripheral portion of the plate with a small overlap to assure continuity of the pattern or design. These "half labels" are targeted to maximize IML yield. The plates generally have a flat angled peripheral portion. This peripheral portion can be considered as a very wide cone with the applicable mathematical equations for cones being utilized to calculate the dimensions of the IML. A computer can be used to facilitate these calculations.

First, a relationship between cone surface area and unfolded cone net is established by inputting plate dimensions into cone equations, and applying output calculations to the IML design. A relationship between the cut out angle $\phi$ and the cone angle $\theta$ can be established as follows (calculations appear in Appendix A of provisional application 61/847,387):

$$\Phi = 2\pi(1 - \sin\theta)$$

The plate rim angle $\theta$ is either measured or selected as desired. Then, the notch cut out angle is calculated in radians from the equation.

Figure 3B:
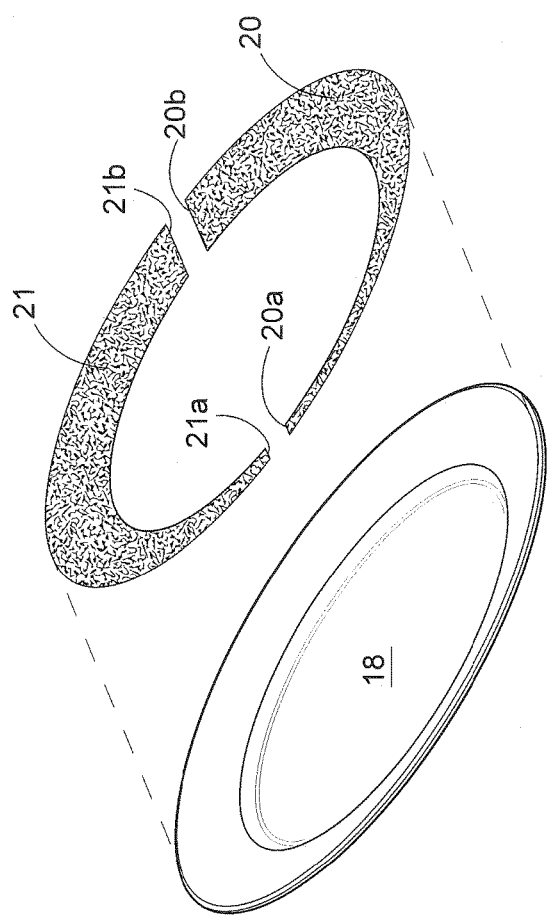
FIG. 3B shows the final IML half for the dinner plate of FIG. 3A.
Figure 3A:
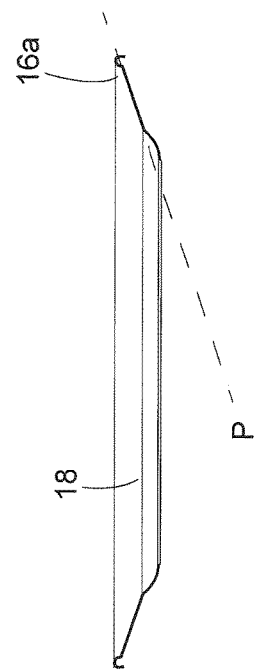
FIG. 3A shows design considerations for a conventional dinner plate.

To measure the plate rim angle, a plane P is projected tangent to the rim and peripheral portion 16a of the plate 18 as shown in FIG. 3A. The projection plane is also angularly offset from a vertical plane at the rim angle. On this plane, circles are drawn to "unfold" the wide cone formed by the peripheral portion of the plate into a flat net without any cut out portion. The cut out is calculated by dividing the net by 2 to obtain the size of the 2 label halves and then dividing by 2 again because each half of the net has two ends. This amount is then subtracted from each end of the label.

Finally, the desired overlap is added to each side of the label: this is typically between 0.2 and 1 mm. For this example, 0.25 mm is added to each end to achieve a nominal overlap of 0.5 mm on each end of the label. The total overlap or underlap should be less than 2 to 3 mm as larger amounts could lead to wrinkling of the label during molding operations.

The final label halves, shown as 20 and 21 in FIG. 3B, conform to essentially the entire peripheral portion of the article, and are applied in the mold so that the ends of two halves 20a and 21a and 20b and 21b overlap to conform the final conical shape of the plate. The design or ornamentation to be provided on the label can be configured to represent a continuous pattern. If the pattern is a simple stripe or bar, this is easily achieved while additional effort may be needed so that the ends of the two label halves match a repeating pattern of, e.g., flowers or geometric shapes.

Prior to injection of material 36 into mold base 32, the two mold halves 32, 34 are securely closed by a clamping unit as is known in the art. Mold base 32 remains fixed in communication with nozzle 38 while mold core 34 exhibits reciprocating movement relative to the mold base. The clamping unit pushes the mold halves 32, 34 together and exerts a force sufficient to ensure closure of mold 30 during injection of material 36 into mold cavities 32a.

As shown in FIGS. 4 and 4A, thermoplastic material 36 is provided for introduction into channels 40 of mold base 32. A ram 46 exerts pressure upon material 36 such that material 36 melts and enters mold base 32 via nozzle 38. Channels 40 carry the molten material from nozzle to cavities 32a. Upon termination of each channel, molten material enters each cavity 32a through a gate 48 that directs material flow. The molten material that cures within channels 40 is attached to the shaped part and must be separated after the part has been ejected from the mold (i.e., resulting in the formation of a gate mark such as gate mark 12f shown with respect to plate 12 of FIG. 2B). Hot and/or cool channel systems may be employed to direct the melting and cooling of the molten material as needed for specific molded articles. The molten material (or resin) may be subjected to at least one heating and cooling cycle for controlling resin flow and retaining the shaped part with the IML ultimately forming a surface of the molded article.

The resin may be clear or colored as desired. It may also be transparent or translucent as desired. Any color can be used with white, black, gold or silver being preferred. As noted herein, clear or transparent colored resin is used when the IML is on the underside of the molded article so that the design or information can be viewed through the article, The color of the article can also be designed to cooperate with or form part of the pattern: e.g., a white plate can provide the background for the design such that space between the edges of the cut notches does not detract from the pattern design. Other designs can allow the color of the plate to be viewed through the label, either by using a label having a clear substrate or by providing holes or "windows" though an opaque label. It is understood that the IMLs may include ornamentation or decoration on all or only part of the segments as desired.

In FIGS. 4 and 4A, robotic assembly 42 transports IMLs 16 in proximity of electrostatic charger 44 to ensure retention of each IML relative to a corresponding profile 34a as shown in FIG. 5. Referring to FIGS. 5 and 6, material 36 is melted by heat and pressure and injected into cavities 32a rapidly to ensure retention of the material in the desired shape. Molten material 36 begins to cool as soon as it contacts interior surfaces of cavities 32a and exterior surfaces of profiles 34a.

Referring to FIG. 7, the material cures in the shape of the plastic part and, upon expiration of the required cooling time, the cooled plastic part may be ejected from mold 30 to reveal the final molded article (i.e., plastic plate 18). Because during cooling the plastic part shrinks and adheres to the mold, a mold release agent may be sprayed onto the surfaces of cavities 32a prior to injection of material 36. Referring to FIG. 8, robotic assembly 42 may transport plates 18 from mold cavity 32a to a processing region and select new IMLs 16 for placement on profiles 34a in a subsequent molding process.

Material 36 may be polypropylene, polystyrene or any other thermoplastic material that, upon curing, exhibits high impact strength, rigidity, toughness and dimensional stability at low cost. Preferably, polypropylene is used as it results in a molded article that can be recycled. Colorants may be added during the molding process to control the color of the molded article. If the molded article is clear, the IML may instead be placed along at least a portion of the bottom surface of the perimeter portion of the molded article. In such embodiments, the resin contacts the printed surface of the IML and is therefore visible through the resin upon the curing thereof. The resin of the molded article also prevents food contact with the inks that provide the decoration, ornamentation or information on the IML.

FIG. 9 illustrates the cross section of a molded plate 50 according to the invention. The plate 50 has an angled peripheral portion 51 which begins at a line 52 between where the plate is provided with a deeper curvature and extends outward to a flange 53 at the perimeter of the plate. The IML can be provided on the top 55 of the peripheral portion where it extends from line 52 to near the flange 53. The exact width of the IML can vary depending upon the design that is to be provided to the article, and it can span the entire peripheral portion or only part of it. Where the IML is providing a line or solid band to the article, the entire peripheral portion is not covered, whereas when the IML is providing, e.g., a floral or artistic pattern, the IML covers more to almost all of the width of the peripheral portion. The precise size of the IML thus depends upon the design, but when it is provided on the top 55 of the peripheral portion, the ink printing or other applied decoration or pattern is preferably protected by a film so that it does not contact food or other edible items that are placed on the plate. Of course, if food grade inks are used or if the article is not used for food service, e.g., when used as a base plate for plants or as wall decorations, or as a serving tray to carry items other than exposed foodstuffs, then the protective layer is not required. Advantageously, the inclusion of a protective layer in these non-essential applications can serve to preserve the inked design or decoration and prevent them from damage due to abrasion or wear due to contact with other articles.

FIG. 9A illustrates how the IML is retained in place during resin introduction for the molding process. Mold cavity 32a is provided with an integral shelf or step 62 configured to retain the IML 55 in place while resin 64 is injected into the mold during the molding process. Shelf 62 is further configured to direct resin flow beyond where the IML 55 sits on the shelf 62 to thus avoid having the rapidly flowing resin either move or displace the IML or enter between the IML and mold to possible obscure or interfere with the development of the desired ornamentation or pattern.

In FIG. 9A, IML 55 is statically charged and held to the B side of tool 68 before resin 64 is injected between the B side of the tool and the A side of the tool 66. The retaining shelf or step 62 helps properly align the IML in the mold and protects it from resin flow during injection. As resin 64 is injected into the mold, the flow front 65 is directed over the edge 56 of the IML 55 after contacting the retaining step 62.

Each mold cavity 32a provides each molded article with a curvature to which the IML conforms. Thus, as resin is deposited into the mold cavity during the molding process, the IML conforms to the curvature without wrinkling Shelf 62 has a height that is approximately three times the thickness of the IML. Typically the label has a thickness of about 0.01 to 0.05 mm and preferably 0.03 mm. Thus, the shelf has a height of between about 0.03 to 0.15 mm and preferably about 0.9 mm.

In some embodiments, the IML has a thickness that is about the same as the height of the shelf but in these embodiments, the resin in injected so that it directly contacts the IML, thus holding it more strongly in position and preventing undesired movement of the IML.

In other embodiments, the IML can be provided in the center of the article, arranged so that the introduction of resin into the mold is designed to be directed at a central area or center of the IML on either the front or back side to assist in holding the IML in position as resin fills the mold. For the square plate embodiment shown herein, the gate mark (12f in FIG. 2B) would be the point where the resin would be introduced into the mold. On a round plate, a round or polygonal label may be centered in the middle of the plate. Of course, a round or polygonal label could be used for the square plate instead of a square label. As the central areas of these plates are generally flat, no special consideration is needed for the IML and a flat, unnotched IML can be used in these areas.

Referring to FIG. 10, a sectional view of the label is provided to show the arrangement of the laminate layers of the IML on the molded plastic substrate. The IML 70 has a three-layer construction. The base or substrate 72 of the label is made of a plastic material that typically is capable of bonding to the resin that is used to form the molded article. One surface of the substrate 72 includes a printed layer 74, typically ink, which includes the design, pattern, written information or other indicia that forms the decoration or information of the IML. If desired, the printed layer could be a separately printed sheet that adheres to the substrate but it is easier in most cases to simply print upon the backing layer. Finally, for the embodiments that require isolation of the printed surface from contact with food, a protective layer 76 is provided. As noted herein, even when the article is not to be used for contact with food, the protective layer is desirable and preferred to prevent deterioration or wear of the design or information on the label. The present labels that include the protective layer are distinguishable from conventional IMLs such as those used for yoghurt containers where the printed designs or information are outside of the container and are not intended to be in contact with food.

Figure 11:
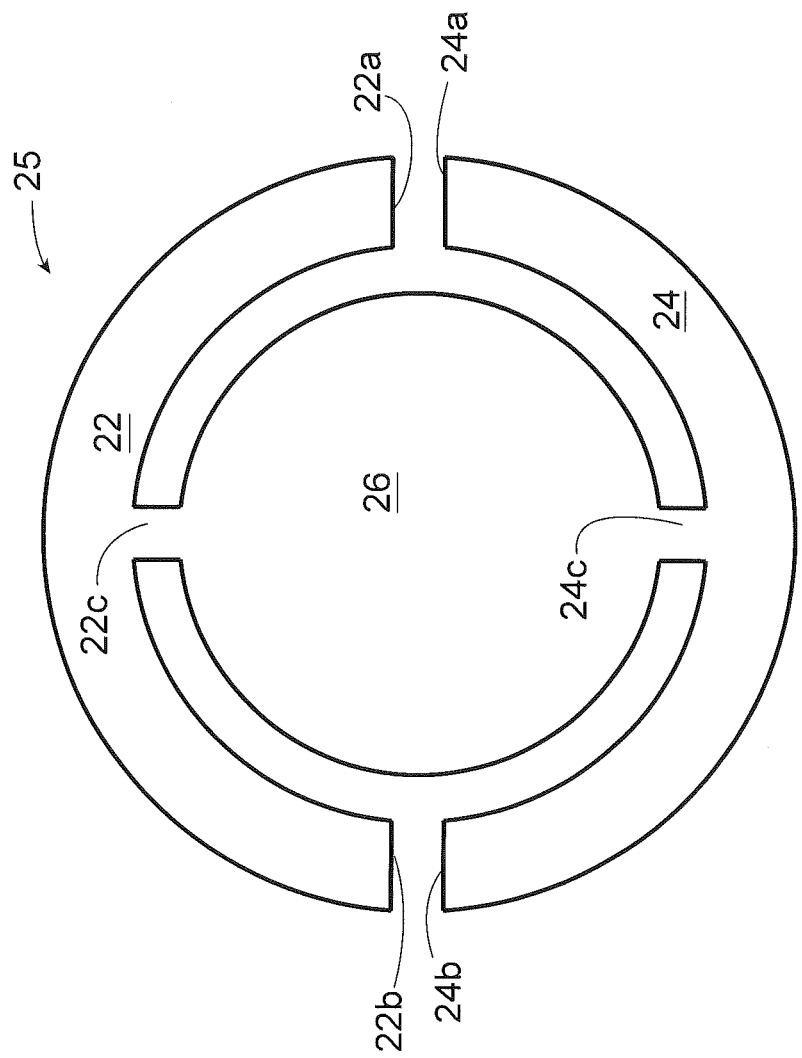
FIG. 11 shows a label design that covers the peripheral portion of a round dinner plate as well as part of the central portion of the plate.

Returning to the dinner plate embodiment shown in FIG. 3, FIG. 11 illustrates a preferred IML for molding into round dinner plates. The IML has a two arc segments 22, 24, each configured with ends 22a, 22b, 24a, 24b, respectively. End 22a is spaced from end 224a and end 22b is spaced from end 24b as disclosed herein so that these ends intersect after being molded into the plate due to conformance of the IML to the angled peripheral portion of the plate to form a continuous surface thereon. The IML 25 also includes a central segment 26 that is designed to be applied to the central portion of the plate. The central segment can be sized as desired to provide almost full coverage of the plate as shown or in a smaller size such as is shown in FIG. 3. Each of the two arc segments 22, 24 includes a connection neck 22c, 24c to the central segment 26. While the connection necks can be provided with ornamentation or aesthetic designs, they also can be made of clear IML material or with a color that matches that of the plate (e.g., white for a white plate) so that they are not visible in the final design. Thus, IML 25 can be designed to provide the ornamentation shown in FIG. 3 with the connection necks not being evident with the molded article having the appearance of that shown in FIG. 3. Alternatively, multiple connection necks can be provided if desired when additional decoration or ornamentation is desired on the plate (e.g., a "wheel spoke" design). The provision of the IML with the arc segments and central segment joined together facilitates placement of the IML in the mold and the maintenance of the segments in the proper position to receive the resin during molding. The central segment 26 is also desirable as the resin injected into the mold can be directed at the center portion of the central segment 26 to assist in not moving the label during the molding process.

While the IML 25 of FIG. 11 may also be configured to fit oval or polygonal or combinations these (i.e., polygonal shapes with rounded or arcuate corners joining the sides. As noted preferred polygonal plates have 3 to 8 sides although other numbers of sides can be used if desired. When multiple arc or polygonal segments are used, each separate segment can be connected to the central segment by a neck connector. Also, instead of use of the label on plates, the molded article can also be a serving tray or shallow bowl.

The methods and devices taught herein are amenable for the creation of plastic plates having profiles selected from a plurality of plate profiles. With the disclosed method, IMLs are accurately positioned in mold cavities without allowing any air to become trapped between the labels and the mold cavity surfaces. The IMLs desirably exhibit growth and shrinkage along the mold cavity surface as the mold temperature changes. If the IML does not have same coefficient of expansion with heat as the mold, it elongates more as the temperature rises and shrinks more as the temperature falls. Failure of the IML to grow and shrink commensurate with temperature fluctuations will cause the IML to buckle and wrinkle, resulting in defective graphics.

The methods and devices disclosed herein also contemplate production of single-use disposable molded articles. It is understood, however, that molded articles as taught herein my be suitable for re-use and/or recycling by consumers. Advantageously, the preferred use of the molded articles of the invention is as a multi-use disposable plate or similar article. This article would have the same weight and cost as current disposable plates, but would be able to withstand a number of washings for reuse. In addition, reuse of the article benefits the environment as compared use of a traditional single-use disposable article. Furthermore, when the article and IML are made of polypropylene, the heat tolerance of that resin is higher, and thus better suited for washing in hot water, and when the useful life of the plate is complete, it may be recycled in the same manner as other plastics.

As used herein, the term "process" or "method" may include one or more steps. Any sequence of steps is exemplary and is not intended to limit methods described herein to any particular sequence, nor is it intended to preclude adding steps, omitting steps, repeating steps, or performing steps simultaneously.

The dimensions and values disclosed herein are not to be understood as being strictly limited to the exact numerical values recited. Instead, unless otherwise specified, each such dimension is intended to mean both the recited value and a functionally equivalent range surrounding that value as well as equivalent units of that value. For example, a dimension disclosed as "40 mm" is intended to mean "about 40 mm" as well as "1.58 inches". The disclosure of such dimensions and values, however, shall not preclude use of any of disclosed devices having dimensions and values outside of the prescribed ranges. The term "about" is used to mean that the exact number is not critical and that a certain tolerance, such as ±10-15% is acceptable.

While the invention has been described in a preferred form, it will be understood that changes, additions, and modifications may be made to the respective articles forming the invention. Accordingly, no limitation should be imposed on the scope of this invention, except as set forth in the accompanying claims.

What is claimed is:

1. A method of making a molded article having front and back sides and a central portion bounded by a peripheral portion having a perimeter and including an outer boundary located near the perimeter and an inner boundary located near the central portion, wherein the peripheral portion on the front side of the article includes a transition from the inner boundary to the central portion of the article which is a shallow-angled or sloped surface, a curved surface or combinations thereof, and with the article including an in mold label (IML) at least on the angled, sloped and/or curved peripheral portion of the article, which method comprises:

providing an in-mold label comprising at least two separate arc segments of a laminated film that includes a backing layer, a printed surface supported by the backing layer, with the printed surface incorporating one or more designs thereon, and a protective film layer upon the printed surface, with the arc segments of the laminated film configured to conform only to part or all of the peripheral portion of the article, with each segment having ends that are configured to intersect with the ends of the other segment to ensure conformance of the IML to the peripheral portion of the article;

providing a mold used in a molding process during which the molded article is fabricated, with the mold having a mold cavity formed by first and second molding surfaces with the first surface corresponding to the front side of the article and the second surface corresponding to the back side of the article, into which cavity resin is deposited to form the article and from which the molded article is extracted, with the mold configured to provide the article with a central portion bounded by a peripheral portion having a perimeter and including an outer boundary located near the perimeter and an inner boundary located near the central portion, with the outer and inner boundaries of the peripheral portion being oriented at an angle or slope and/or being curved with respect to the central portion of the molded article;

transferring the IML to the mold so that the printed surface of each arc segment is placed adjacent one of the molding surfaces of the mold cavity in a position corresponding to and within the peripheral portion of the article with the ends of each arc segment configured for placement to form intersecting ends of adjacent arc segments to ensure conformance of the IML to the angled, sloped and/or curved peripheral portion of the article;

closing the mold by bringing the other of the molding surfaces into position to form the mold cavity;

delivering the resin to the mold cavity having the IML therein wherein the ends of the arc segments are fixed in place to intersect during molding of the article; and recovering the molded article from the mold with the IML present only upon the peripheral portion of the molded article.

2. The method of claim 1, wherein the peripheral portion transitions from the outer boundary to the inner boundary by a shallow-angled or sloped surface such that the peripheral portion is configured as a shallow, open conical surface, wherein the IML is provided only within the inner and outer boundaries of the peripheral portion.

3. The method of claim 1, wherein the IML is electrostatically charged prior to disposition in the mold and the printed surface of the IML includes one or more aesthetic designs.

4. The method of claim 1, wherein the IML is placed on the mold surface that forms the front side of the molded article, with the backing layer of the IML contacting the peripheral portion of the front side of the molded article and the protective layer forming part of a front surface of the molded article, with the protective film layer being sufficiently transparent so that the aesthetic design is visible therethrough.

5. The method of claim 1, wherein the IML is placed on the mold surface that forms the back side of the molded article, with the backing layer of the IML contacting the peripheral portion of the back side of the molded article and the protective film layer forming part of a back surface of the back side of the molded article, with the molded article and backing layer being sufficiently transparent so that the aesthetic design is visible therethrough.

6. The method of claim 1, the backing layer comprises a clear layer of polypropylene or polystyrene, the protective film layer comprises polypropylene or polyester and the method further comprises subjecting the resin to a heating and cooling cycle for controlling resin flow and retaining the molded article shape.

7. The method of claim 1, wherein the ends of the IML segments overlap by a minimum intersection of 0.5 mm.

8. The method of claim 1, wherein the molded article and IML have a round or oval perimeter.

9. The method of claim 8, wherein the molded article and IML have a round perimeter and two arc segments are provided.

10. The method of claim 1, further comprising providing the mold with an integral shelf configured to retain the IML on the mold surface during the molding process and further configured to direct resin flow beyond an IML edge while avoiding entry of resin between the label and the mold surface, wherein the shelf has a height about three times a thickness of the IML.

11. The method of claim 1, which further comprises providing a magazine to hold multiple IMLs in place for transfer to the mold surface and wherein the molded article comprises a plastic plate having a plate profile selected from a plurality of round, oval or polygonal plate profiles or combinations thereof.

12. The method of claim 1, wherein the IML includes printing on both sides of the backing layer and the molded article is made of clear resin so that the printing is visible from both the front and back sides of the molded article.

13. A method of making a molded article having front and back sides and a central portion bounded by a peripheral portion having a perimeter and including an outer boundary located near the perimeter and an inner boundary located near the central portion, with the peripheral portion on the front side of the article transitioning from the outer boundary to the inner boundary by a transition surface comprising a combination of a shallow-angled or sloped surface and a curved surface such that the shallow-angled or sloped surface of the peripheral portion is configured as an open conical surface, and with the article including an in mold label (IML) on the transition surface of the peripheral portion of the article, which method comprises:

providing an in-mold label comprising:

a laminated film that includes a backing layer, a printed surface supported by the backing layer, with the printed surface incorporating one or more designs thereon, and a protective film layer upon the printed surface, with the laminated film configured in at least two separate arc segments that conform to the shallow-angled or sloped surface of the peripheral portion of the article, with each arc segment configured for placement to form intersecting ends the ends of the other segment to ensure conformance of the IML to the peripheral portion of the article, with the IML including a central segment for application to the central portion of the molded article and with each arc segment of the IML including a connection neck extending between the inner boundary of the arc segments and the central segment over the curved surface, wherein the arc segments of the IML are provided within the inner and outer boundaries of the peripheral portion;

providing a mold used in a molding process during which the molded article is fabricated, with the mold having a mold cavity formed by first and second molding surfaces with the first surface corresponding to the front side of the article and the second surface corresponding to the back side of the article, with the mold configured to provide the molded article with a central portion bounded by a peripheral portion having a perimeter and including an outer boundary located near the perimeter and an inner boundary located near the central portion, with the peripheral portion transitioning from the outer boundary to the inner boundary by a transition surface comprising a combination of a shallow-angled or sloped surface and a curved surface and into which mold cavity resin is deposited to form the article and from which the molded article is extracted;

transferring the IML to the mold so that the printed surface of each arc segment is placed adjacent one of the molding surfaces of the mold cavity in a position corresponding to and within the peripheral portion of the article with the ends of each arc segment configured for placement to form intersecting ends of the other arc segment to ensure conformance of the IML to the angled, sloped and/or curved peripheral portion of the article, and with the connection necks provided upon the curved surface of the molded article;

closing the mold by bringing the other of the molding surfaces into position to form the mold cavity;

delivering the resin to the mold cavity having the IML therein wherein the ends of the arc segments are fixed in place to intersect during molding of the article; and recovering the molded article from the mold with the IML present both on the peripheral and central portions and on portions of the curved surface of the molded article.

14. The method of claim 13, wherein two arc segments are provided and the ends of the IML segments overlap by a minimum intersection of 0.5 mm.

15. The method of claim 13, the backing layer comprises a clear layer of polypropylene or polystyrene, the protective film layer comprises polypropylene or polyester and the method further comprises subjecting the resin to a heating and cooling cycle for controlling resin flow and retaining the molded article shape.

16. A method of making a molded article having front and back sides and a central portion bounded by a peripheral portion having a perimeter and including an outer boundary located near the perimeter and an inner boundary located near the central portion, wherein the peripheral portion on the front side of the article on the front side of the article includes a transition from the inner boundary to the central portion of the article which is a shallow-angled or sloped surface, a curved surface or combinations thereof, and with the article including an in mold label (IML) at least on the angled, sloped and/or curved peripheral portion of the article, which method comprises:

providing a first in-mold label comprising at least two separate arc segments of a laminated film that includes a backing layer, a printed surface supported by the backing layer, with the printed surface incorporating one or more designs thereon, and a protective film layer upon the printed surface, with the arc segments of the laminated film configured to conform only to part or all of the peripheral portion of the article, with each segment having ends that are configured to intersect with the ends of the other segment to ensure conformance of the IML to the peripheral portion of the article;

providing a second IML of a laminated film that includes a backing layer, a printed surface supported by the backing layer, with the printed surface incorporating one or more designs thereon, and a protective film layer upon the printed surface, wherein the second IML includes a central segment for application to the central portion of the molded article;

providing a mold used in a molding process during which the molded article is fabricated, with the mold having a mold cavity formed by first and second molding surfaces with the first surface corresponding to the front side of the article and the second surface corresponding to the back side of the article, into which cavity resin is deposited to form the article and from which the molded article is extracted, with the mold configured to provide the article with a central portion bounded by a peripheral portion having a perimeter and including an outer boundary located near the perimeter and an inner boundary located near the central portion, with the outer and inner boundaries of the peripheral portion being oriented at an angle or slope or being curved with respect to the central portion of the molded article;

transferring the first and second IMLs to the mold so that the printed surface of each arc segment is placed adjacent one of the molding surfaces of the mold cavity in a position corresponding to and within the peripheral portion of the article with the ends of each arc segment configured for placement to form intersecting ends of adjacent arc segments to ensure conformance of the first IML to the angled, sloped and/or curved peripheral portion of the article;

closing the mold by bringing the other of the molding surfaces into position to form the mold cavity;

delivering the resin to the mold cavity having the IMLs therein wherein the ends of the arc segments of the first IML are fixed in place to intersect during molding of the article; and recovering the molded article from the mold with the IMLs respectively present upon the peripheral and central portions of the molded article such that the molded article includes a ring of the at least two separate arc segments within the inner and outer boundaries on the peripheral portion of the article and the central segment on the central portion of the article, wherein the central segment is spaced from and not in contact with the ring of arc segments.

17. The method of claim 1 wherein each arc segment has exposed straight ends that are configured to intersect with the straight ends of the other segment.

18. The method of claim 16, wherein the IML is placed on the mold surface that forms the front side of the molded article, with the backing layer of the IML contacting the peripheral portion of the front side of the molded article and the protective layer forming part of a front surface of the molded article, with the protective film layer being sufficiently transparent so that the aesthetic design is visible therethrough.

19. The method of claim 16, wherein the IML is placed on the mold surface that forms the back side of the molded article, with the backing layer of the IML contacting the peripheral portion of the back side of the molded article and the protective film layer forming part of a back surface of the back side of the molded article, with the molded article and backing layer being sufficiently transparent so that the aesthetic design is visible therethrough.

20. The method of claim 16, the backing layer comprises a clear layer of polypropylene or polystyrene, the protective film layer comprises polypropylene or polyester and the method further comprises subjecting the resin to a heating and cooling cycle for controlling resin flow and retaining the molded article shape.

* * * * *